(12) United States Patent
Mah

(10) Patent No.: US 10,886,872 B1
(45) Date of Patent: Jan. 5, 2021

(54) PORTABLE PHOTOVOLTAIC ASSEMBLY

(71) Applicant: Gordon B. J. Mah, Sunnyvale, CA (US)

(72) Inventor: Gordon B. J. Mah, Sunnyvale, CA (US)

(*) Notice: Subject to any disclaimer, the term of this patent is extended or adjusted under 35 U.S.C. 154(b) by 0 days.

(21) Appl. No.: 16/748,113

(22) Filed: Jan. 21, 2020

Related U.S. Application Data

(60) Provisional application No. 62/795,921, filed on Jan. 23, 2019.

(51) Int. Cl.
*H02S 10/40* (2014.01)
*H02S 30/20* (2014.01)
*H02S 30/10* (2014.01)
*F24S 25/40* (2018.01)
*H02S 20/32* (2014.01)

(52) U.S. Cl.
CPC .............. *H02S 10/40* (2014.12); *F24S 25/40* (2018.05); *H02S 20/32* (2014.12); *H02S 30/10* (2014.12); *H02S 30/20* (2014.12)

(58) Field of Classification Search
CPC .................................................. G04B 49/02
See application file for complete search history.

(56) References Cited

U.S. PATENT DOCUMENTS

| | | | |
|---|---|---|---|
| 4,226,256 A | 10/1980 | Hawley | |
| 4,421,943 A | 12/1983 | Withjack | |
| 7,492,120 B2 | 2/2009 | Benn et al. | |
| 8,492,645 B1 | 7/2013 | Strahm | |
| 10,116,254 B1* | 10/2018 | Bosley | H02S 30/20 |
| 2004/0211457 A1 | 10/2004 | Azzam et al. | |
| 2008/0210289 A1* | 9/2008 | Chen | H02S 20/00 |
| | | | 136/244 |
| 2012/0291847 A1* | 11/2012 | Rowe, Jr. | H02S 10/40 |
| | | | 136/245 |
| 2013/0061902 A1 | 3/2013 | Quinn | |
| 2015/0013750 A1 | 1/2015 | Meppelink et al. | |
| 2015/0090315 A1* | 4/2015 | Spisak | F24S 30/20 |
| | | | 136/245 |
| 2015/0288319 A1* | 10/2015 | Hartman | H02S 10/40 |
| | | | 136/245 |

(Continued)

OTHER PUBLICATIONS

Mount Vernon https://www.mountvernon.org/preservation/collections-holdings/browse-the-museum-collections/object/w-715/ captured Mar. 20, 2016 (Year: 2016).*

*Primary Examiner* — Magali P Slawski
(74) *Attorney, Agent, or Firm* — Behmke Innovation Group LLC; James M. Behmke; James J. Wong

(57) ABSTRACT

In one embodiment, a portable photovoltaic assembly is disclosed. In particular, in one example embodiment, the portable photovoltaic assembly described herein comprises: a solar panel platform; a plurality of solar panel holders affixed to a front of the solar panel platform and configured to hold one or more solar panels; a back support extending from a back of the solar panel platform at an angle between the solar panel platform and the back support; and one or more link arms removably connected between the solar panel platform and the back support to hold the angle between the solar panel platform and the back support. Other embodiments are further described herein that provide for portability and adjustability in an easy-to-use manner.

18 Claims, 12 Drawing Sheets

(56) References Cited

U.S. PATENT DOCUMENTS

| | | | |
|---|---|---|---|
| 2016/0072433 A1* | 3/2016 | Sorgento | ........... H02S 40/34 136/245 |
| 2016/0285304 A1 | 9/2016 | Stiefel | |
| 2016/0301354 A1 | 10/2016 | Draffin, II et al. | |
| 2018/0278201 A1 | 9/2018 | Tehan et al. | |

* cited by examiner

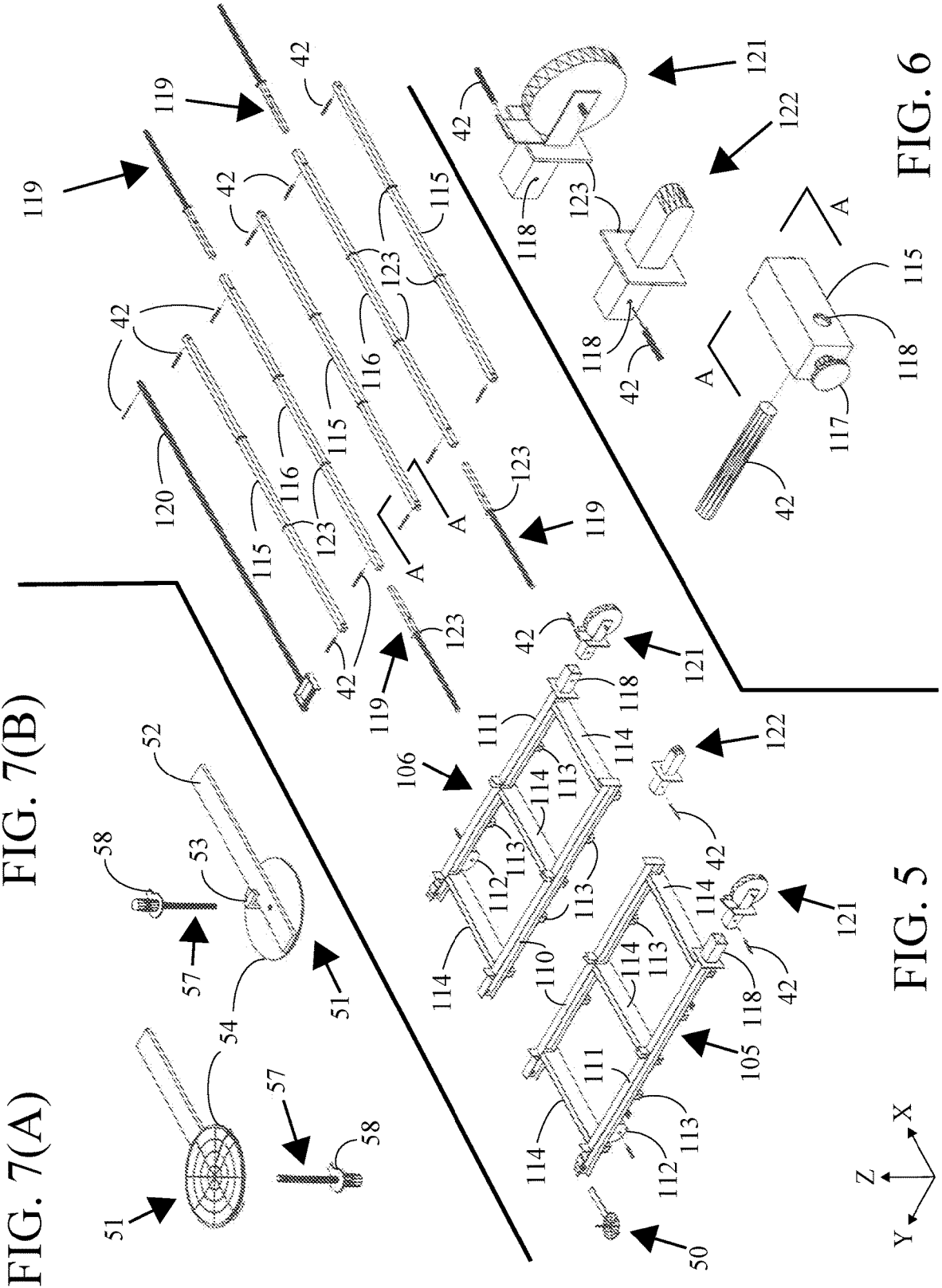

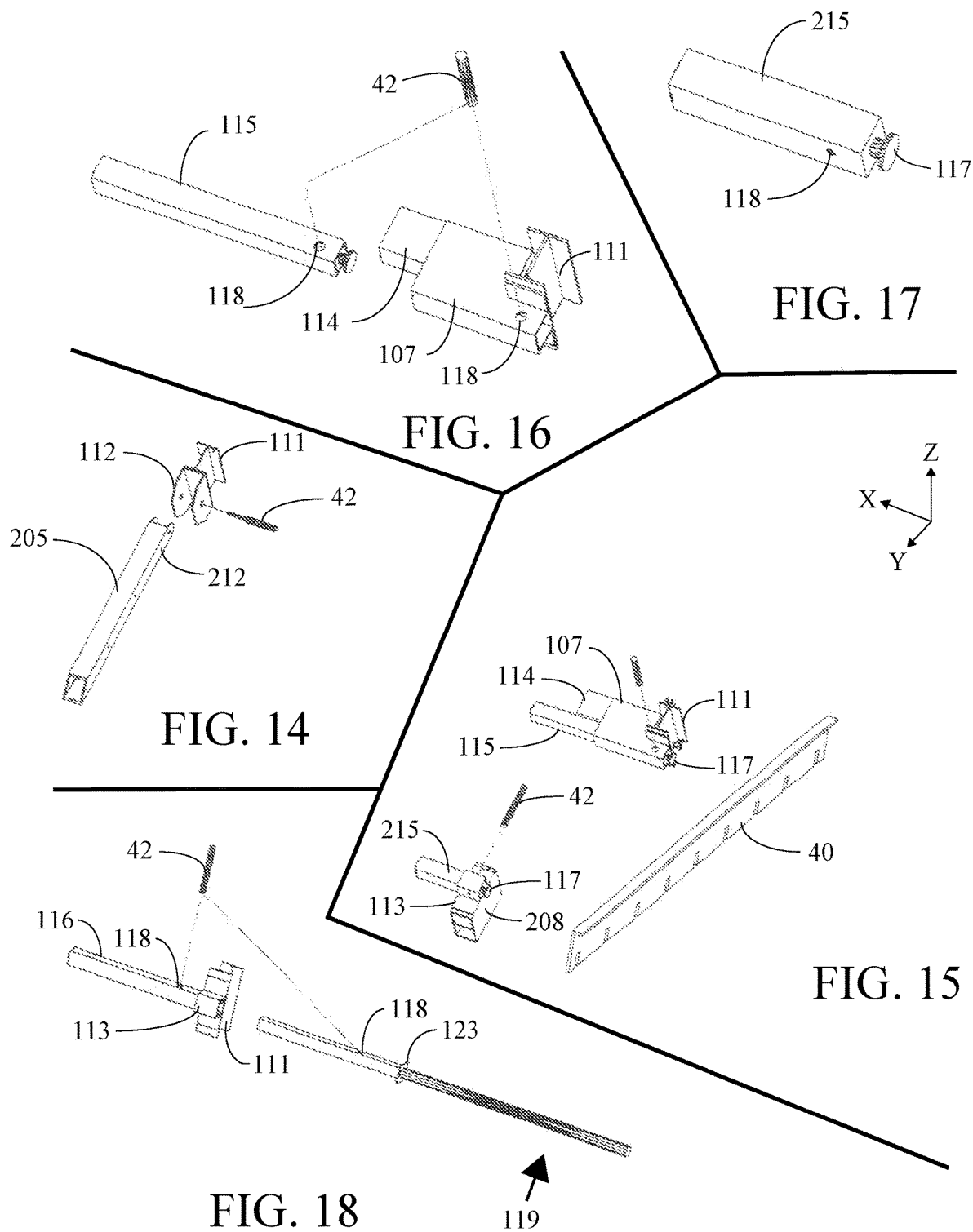

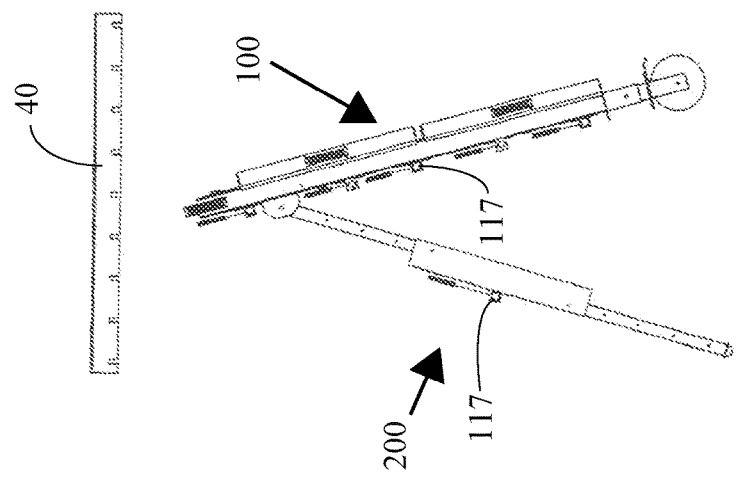
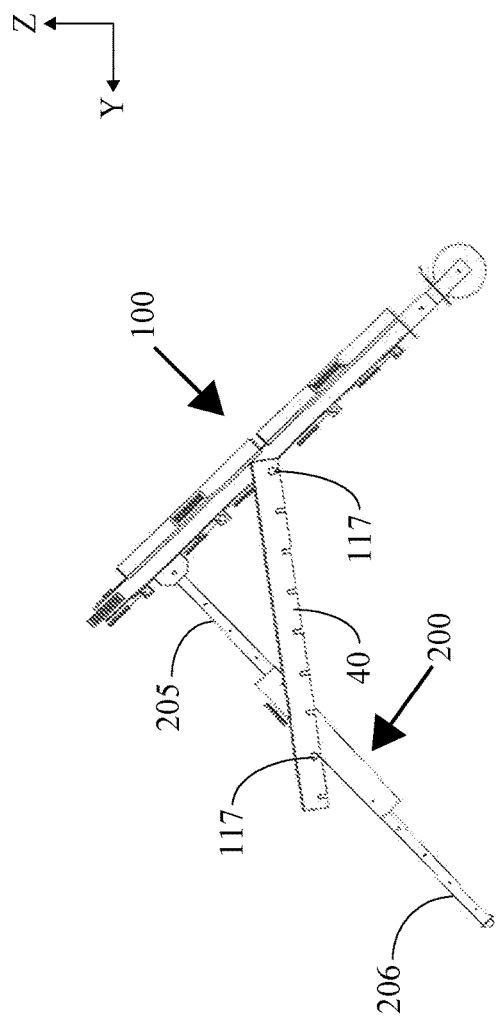
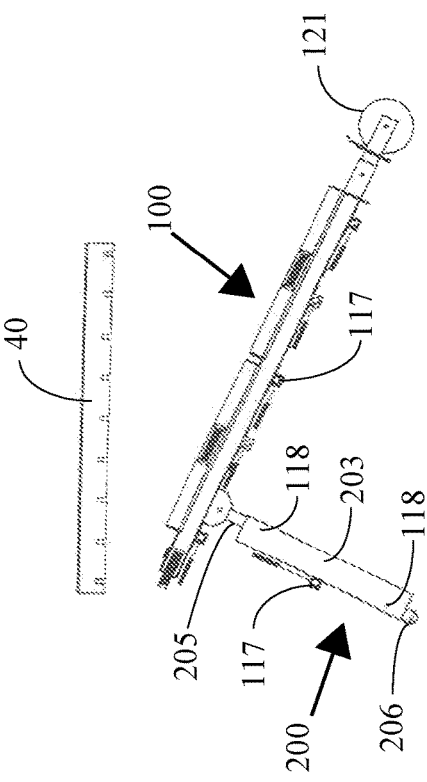
FIG. 19
FIG. 20
FIG. 21

PORTABLE PHOTOVOLTAIC ASSEMBLY

RELATED APPLICATION

The present application claims priority to U.S. Provisional Application No. 62/795,921, filed Jan. 23, 2019, entitled PORTABLE PHOTOVOLTAIC ASSEMBLY, by Gordon B. J. Mah, the contents of which are incorporated herein by reference.

TECHNICAL FIELD

The present disclosure relates generally to photovoltaic assemblies, and, more particularly, to a portable photovoltaic assembly.

BACKGROUND

Natural disasters (such as tsunamis, typhoons, hurricanes, earthquakes, and so on) and wars or violent conflicts can create victims up to the millions very quickly, particularly in developing countries. Quite often the victims of such incidents are congregated at rugged areas with destroyed roads, bridges, power grids, and no available transport vehicles. The supply routes for electricity generators and gasoline are cut off from such areas; as such, the surviving victims have no access to electricity for a long time. The victims, their helpers, and protectors will need huge amount of electricity right away for operating lifesaving and ordinary medical equipment, lighting, communication, power tools, etc. Also, sometimes in the least developed countries ("LDC", a United Nations classification), contagious diseases, such as Ebola, spread because the area lacks electrical freezers or cooling carriers for transporting and storing vaccines, or blood for transfusion, or to operate medical equipment, etc. In addition, many times, heatwaves have killed more than hundreds of people each time; which could have been alleviated if there were sufficient electricity for cooling appliances. All aforementioned cases show that disaster victims need large amount of electricity immediately. The equipment to generate the electricity, however, must be able to be delivered quickly to the rugged or isolated area where the victims are located.

SUMMARY

A portable photovoltaic assembly is described herein, which, in one example embodiment, comprises: a solar panel platform; a plurality of solar panel holders affixed to a front of the solar panel platform and configured to hold one or more solar panels; a back support extending from a back of the solar panel platform at an angle between the solar panel platform and the back support; and one or more link arms removably connected between the solar panel platform and the back support to hold the angle between the solar panel platform and the back support.

In one embodiment, the back support extends from a pivotable fitting of the back of the solar panel platform, and wherein the one or more link arms comprise a plurality of positions to connect to one or both of the solar panel platform and the back support to adjust the angle between the solar panel platform and the back support. In one embodiment, the plurality of positions on the one or more link arms comprise notches. In one embodiment, the one or more link arms are configured to connect to a connector bar of the solar panel platform and to a respective support bar of the back support.

In one embodiment, the solar panel platform comprises: a plurality of platform frames; and a plurality of connector bars interconnecting the plurality of platform frames into the solar panel platform. In one embodiment, one or more of the plurality of connector bars comprise lift bars with handles extending outwardly of the plurality of platform frames.

In one embodiment, the back support comprises: a back support frame; and removable and adjustable legs extending from the back support frame. In one embodiment, the removeable and adjustable legs comprise upper legs and lower legs extending from the back support frame.

In one embodiment, the portable photovoltaic assembly further comprises a plurality of quick release pins.

In one embodiment, the portable photovoltaic assembly further comprises a sun tracker configured to facilitate pointing of the portable photovoltaic assembly toward a sun. In one embodiment, the sun tracker comprises: a sun tracker plaque; and a sun pointer arranged to cast a shadow onto the sun tracker plaque. In one embodiment, the sun tracker comprises: a sun tracker plaque with a pattern of circles; and a sun pointer extending from a center of the pattern of circles.

In one embodiment, the portable photovoltaic assembly further comprises at least two wheels. In one embodiment, the at least two wheels are removeable and comprise swivel and brake casters.

In one embodiment, the portable photovoltaic assembly further comprises one or more separately adjustable leg components on one or both of the back support and the solar panel platform.

In one embodiment, the portable photovoltaic assembly further comprises a removable carrying handle attached to the solar panel platform.

In one embodiment, the portable photovoltaic assembly further comprises one or more anchor ties attached to the portable photovoltaic assembly, the one or more anchor ties configured to tie the portable photovoltaic assembly to one or more stable objects. In one embodiment, the one or more stable objects are selected from a group consisting of: trees; rocks; stakes; bags of sand; bags of rocks; buildings; and machinery.

In one embodiment, the portable photovoltaic assembly further comprises one or more solar panels attached to the solar panel platform. In one embodiment, the portable photovoltaic assembly further comprises one or more panel stiffener channels on a back of the one or more solar panels, wherein the one or more panel stiffener channels are configured to lockingly slide into engagement with the solar panel platform.

Other embodiments are further described herein, and this summary is not meant to limit the scope of the present disclosure.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 5 is an exploded perspective view of the platform structure of FIG. 4, with all the elements separated;

FIG. 6 shows enlarged perspective views of an example wheel set, leg tip, and a section view at the end of a connector bar of FIG. 5;

FIGS. 7A-7B show two exploded perspective views (front side and back side) of an example sun tracker, dissembled into separated elements;

FIG. 14 shows a fragmentary perspective view of an example frame fitting, a segment of the post cut from the solar panel platform, and upper leg of the back support of FIG. 3;

FIG. 15 shows a fragmentary perspective view of two groups of example segments, and a link arm of FIG. 3, where the upper group has segments of the solar panel platform (a post, connector bar, reinforce channel, and frame beam), and where the lower group has segments from a back support (support bar, side beam), and a bar fitting;

FIG. 16 shows an enlarged fragmentary perspective view of the upper group of segments of the solar panel platform as shown in FIG. 15, with the connector bar pulled out from the reinforce channel;

FIG. 17 shows an enlarged fragmentary perspective view of an example segment of the support bar of the back support as shown in the lower group segments in FIG. 15;

FIG. 18 shows an enlarged fragmentary perspective view of the segment cut off from platform structure at section A-A of FIG. 10;

FIG. 19 is a side elevation view showing the right side of an example PPA;

FIG. 20 shows a side elevation view of the PPA of FIG. 19 being changed to a different tilt angle for its solar panels;

FIG. 21 shows a side elevation view of the PPA of FIG. 19 being changed to another tilt angle for its solar panels;

DESCRIPTION OF EXAMPLE EMBODIMENTS

Figure 1:
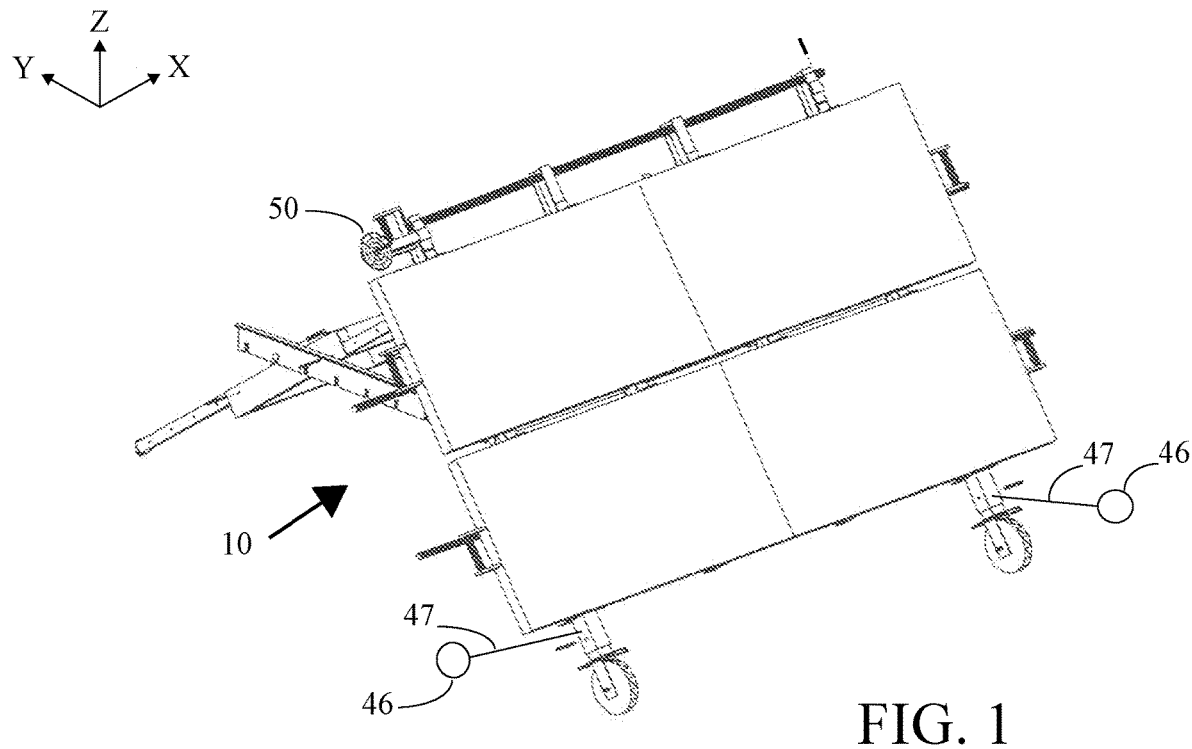
FIG. 1 is a front perspective view of one example embodiment of a portable photovoltaic assembly (PPA)

As noted above, natural disasters and wars can destroy roads, bridges, and power grids, often leaving no available transport vehicles for vital supplies or repairs. In particular, the supply routes for electricity generators and gasoline are cut off from such areas, leaving the surviving victims without access to electricity for extended periods of time, and thus without access to vital electrical components such as medical equipment, lighting, communication, power tools, and so on.

Furthermore, if a solar energy assembly is used to produce electricity at or near a war zone, fighting might suddenly erupt nearby, potentially endangering the assembly (e.g., from gun shots, shrapnel, or theft). In addition, when the solar assembly is used in a disaster area, particularly where no weather forecasts and/or adequate shelters exist, a sudden coming strong storm or strong earthquake aftershocks may damage the assembly.

In addition to being frequently exposed to such disastrous situations, many least developed countries (LDC), in particular, are not only unable to maintain sufficient electrical functionality and/or to quickly repair power grids, but they are also more likely to have little to no electrical infrastructure to begin with. For instance. LDCs are significantly more susceptible to the lack of electricity due to poorly implemented and maintained power grids, and ground-mount solar assemblies are traditionally too costly and complex. As pointed out above, the lack of available electricity in LDCs often causes medical issues and the spread of disease due to the need for electrical medical equipment or freezers/coolers needed for transporting and storing blood or vaccines. Moreover, many people in LDCs that do not have access to electricity for cooling appliances (e.g., air conditioners or fans) continue to suffer through extended heatwaves each year, often resulting in the death of hundreds of people.

Notably, although the Paris Agreement has considerably increased the generation of electricity with solar energy in developed countries, solar energy in LDCs is still lagging behind. Specifically, access to low cost electricity has been very slow and very limited in developing solar energy in LDCs, which urgently need a great amount of low-cost electricity to operate machines, computers, communication equipment, etc. in order to gain production, knowledge, and connections with the developed countries. Without a sufficient supply of electricity, LDCs cannot grow their industries and employment, and improve their public education and living conditions.

There are many obstacles for LDCs to develop their solar energy industry. The biggest obstacle is the lack of financial resources. For instance, it is difficult for LDCs to purchase and/or import expensive solar energy equipment, or to hire contractor companies from developed countries to develop their solar energy industry. Another big obstacle is the lack of technical resources. LDCs are in shortage of electrical engineers, electricians, equipment, etc. to develop their solar industry, and it will take a long time for LDCs to develop a stable electrical engineering industry. Moreover, theft or sabotage of solar assembly installations is rampant in LDCs where deep socio-economic disparities exist, leaving many would-be installers in fear of becoming an early adopter of the technology.

As described below, portable solar energy systems can address and alleviate many of the aforementioned problems. Portable solar energy assembly products that are currently available, however, are typically small in size and may be used to produce electricity only for small equipment, such as a cell phone, a computer, etc. Conversely, larger portable solar energy assemblies are so large that they need vehicle transportation, and are not designed for disastrous or difficult situations as discussed above, typically requiring complex knowledge and hard-to-find proprietary components to assemble and maintain.

—Portable Photovoltaic Assembly—

The embodiments herein are directed toward a portable photovoltaic assembly that addresses the need detailed above. In particular, since disaster victims need a large amount of electricity immediately, the equipment to generate the electricity must be able to be delivered quickly and easily to the rugged or isolated area where the victims are located. Further, to avoid being stolen or damaged when it is not operating, the assembly herein can be moved in-and-out of shelter daily. Also, if the shelter is small, or there is a need to move the assembly a far distance, then it is better if the assembly can be dissembled and reassembled easily and quickly. Damaged assemblies can be repaired easily by dissembling the device and replacing the damaged parts, often with locally sourced materials. Moreover, due to financial and technical limitations of LDCs, the solar energy assembly herein comprises small, easy-to-make and assemble components, which will be a great help for LDCs' extremely low-cost work force and limited financial resources, helping to further develop their solar energy industry.

Specifically, as described in greater detail below, the design of the portable photovoltaic assembly (PPA) herein is developed particularly to help people in disaster areas and in LDCs, though have general applicability in any situation in need of powerful yet portable solar energy. In one example embodiment, the PPA is comprised of many smaller elements. To lower the cost of the PPA, most of the elements of the example embodiment of the PPA can be made with hand tools and small power tools, by low-cost labor in developing countries. A number of the elements are assembled with quick release pins, and ties. The quick release pins, and ties can be removed easily and quickly to dismantle the example embodiment of the PPA. If some parts of a PPA have been damaged, the damaged parts can be easily and quickly removed and replaced. Then, the example embodiment can be reassembled easily and quickly to produce electricity again. Also, the PPA can be easily dismantled into small elements which can be hand carried to disaster area or war zone where roads and bridges are destroyed; or to isolated rugged mountain areas. After arriving at the location, the elements of the PPA can be assembled and generating electricity quickly. However, if some elements of the PPA are never required to be dismantled, they can be connected together with rivets, bolts, welding, etc. as in usual practice, instead of quick release pins and ties.

As described below, the construction of the PPA is very straightforward. With some training, low-skilled workers can assemble, dissemble, and operate it. In a disaster area there might be tens of thousands or more victims, but, the number of helpers coming to generate electricity may be very few. Similarly, in LDCs, there are a vast number of unemployed non-skill persons, but very few electricians. With the PPA design herein, victims in a disaster area and the non-skilled persons in LDC can be trained quickly to assemble, dissemble, and operate the PPA.

The PPA herein is easy to be moved as a whole, or in dismantled elements. It will be operated out in the open under the sun, when the wind speed and/or wind force are at acceptable levels. The PPA herein can be moved easily into shelter at sunset, and before the expected arrival of storm, strong gust, or moving away quickly from approaching armed conflict. If a strong gust or earthquake aftershock is coming suddenly, the PPA herein can be folded up rapidly (e.g., by moving or removing a back support), then it can be laid down on the ground to avoid serious damage. Also, to prevent the PPA from being toppled by a sudden strong gust, or earthquake aftershock at earthquake disaster area, in another example embodiment, the PPA herein may be equipped with one or more anchors and/or anchor ties.

Also, if a solar panel can track the sun in dual axial rotating and tilting of the panel to let solar rays be normal to the panel, it can produce 50% or more electricity than a solar panel mounted fixedly pointing to the most favorable direction and tilt angle. This amount of increased electricity is very important to the victims at disaster area, and the electricity shortage LDC. As such, the assembly herein can be adjusted easily to point the direction and tilt angle of the solar panels to let the sun's rays point normal to the solar panels (to produce more electricity), such as standing closer to a vertical position in the early morning and late afternoon, and a more angular or even horizontal position during midday hours, and by turning the entire assembly to track the path of the sun across the sky. Further, in one example embodiment, the PPA herein may be equipped with a sun tracker to enable even non-technical people to know when the solar panels are properly pointing toward the sun.

In still further example embodiments described further herein, since disaster areas, such as a war-torn area or an area destroyed by natural disaster, as well as rugged (e.g., mountainous) areas can prove difficult for finding a place which is even and level to set a PPA to avoid toppling and wobbling, the PPA herein may be equipped with various apparatuses, such as adjustable upper and lower legs and attachable extensions for these situations. In the embodiment, the upper legs and lower legs are used on the back of the assembly, while the attachable extensions are used at the front, such that by adjusting the extended length of these three apparatuses (generally referred to as "separately adjustable leg components"), it can prevent toppling and wobbling of the PPA.

Notably, the illustrative portable photovoltaic assembly discussed herein describes only the supporting structures and solar panels. However, additional required electronic and electrical parts that will be understood by those skilled in the art (such as the inverter, controller, electrical cables, batteries, etc.) will be same as those used in conventional portable solar assemblies, and are not discussed herein.

In following discussions, with reference to the drawings, assume the origin of the three-dimensional coordinate system sits at the center of the PPA (illustratively "PPA 10" in the drawings), and the solar panels facing the sun are the "front" side. As such, the "left" side of PPA 10 indicates the positive-X direction area, the "right" side of PPA 10 indicates the negative-X direction area. The front side of PPA 10 indicates the negative-Y direction area, while the "back" side indicates the positive-Y direction area. The positive-Z axis is pointing upward. The constructions of left half and right half are illustratively symmetrical to the Y-Z plane.

Also, there are many quick release pins and ties described for use in PPA 10. They can be installed and removed easily to assemble and dismantle the PPA 10. They are drawn as symbolic elements. All symbolic quick release pins are drawn as the same sized small cylindrical rod, and a thin black line is drawn from the end of the pin to the hole where the pin should be inserted. This black line is an imaginary line used to show the path of inserting the pin. Also, all the symbolic ties are drawn as a straight line, with each end touching the element to be tied on. However, in reality, each pin or tie will have its appropriate diameter, length, shape, and construction. The quick release pins can be one of a number of different types of pins, for example purposes, a clevis pin with hairpin cotter, a detent clevis pin, etc. The ties can be one of a number of connectors, for example purposes, a piece of wire, chain, or rope; and, they might be equipped with a hook, a locking snap hook, etc. at one or both ends.

Figure 2:
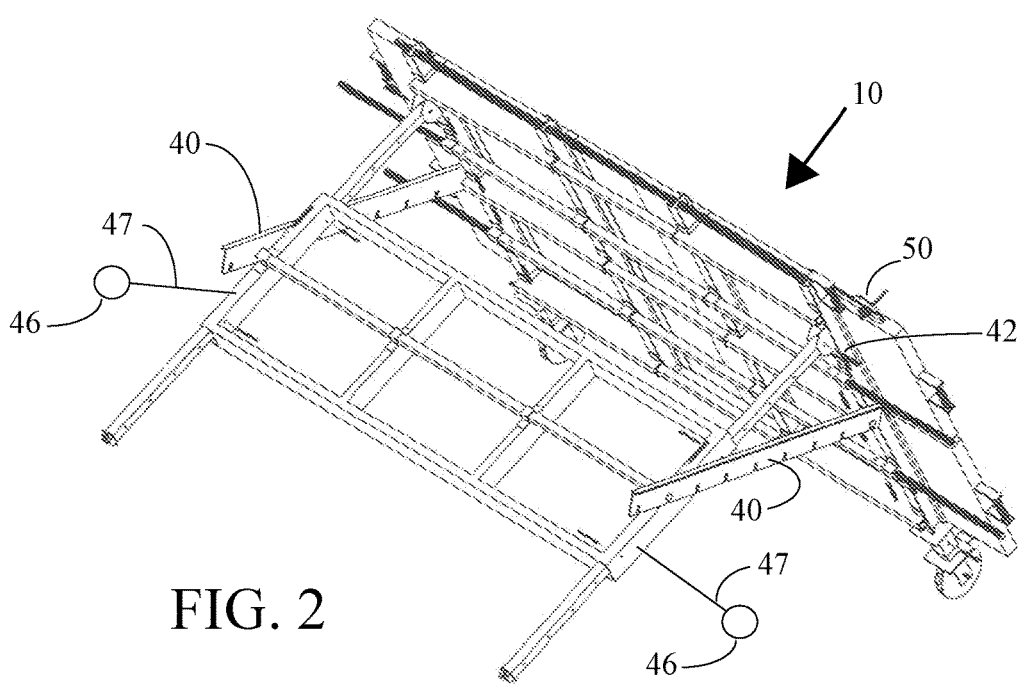
FIG. 2 is a rear perspective view of an example PPA.

Referring now specifically to the drawings, FIG. 1 is a perspective view of the front and right side of an example embodiment PPA 10. FIG. 2 is a perspective view of the back and right side of the embodiment 10. In FIGS. 1 and 2, at the upper right-hand corner of embodiment 10, there is an illustrative sun tracker 50. In addition, there are the symbolic element anchors 46 and anchor ties 47. For reducing the cost, and to allow easier transporting of PPA 10 to rugged areas, preferably a heavy object used as an anchor can be made of local materials; such as a big rock, a bag of pebbles and soil, a segment of tree trunk, etc. The anchor tie can be a piece of rope, wire, or chain, etc. One end of the anchor tie is tying to the anchor, the other end is firmly attached to any appropriate location on PPA 10 to prevent it from being toppled by wind or earthquake forces. (For example, one or more anchor ties may be attached to PPA 10, and configured to tie the portable photovoltaic assembly to one or more stable objects, such as trees, rocks, stakes (into the ground), bags of sand, bags of rocks, buildings, nearby (e.g., powered) machinery, and so on.) In the following drawings, all anchors and anchor ties are shown with symbolic elements.

Figure 3:
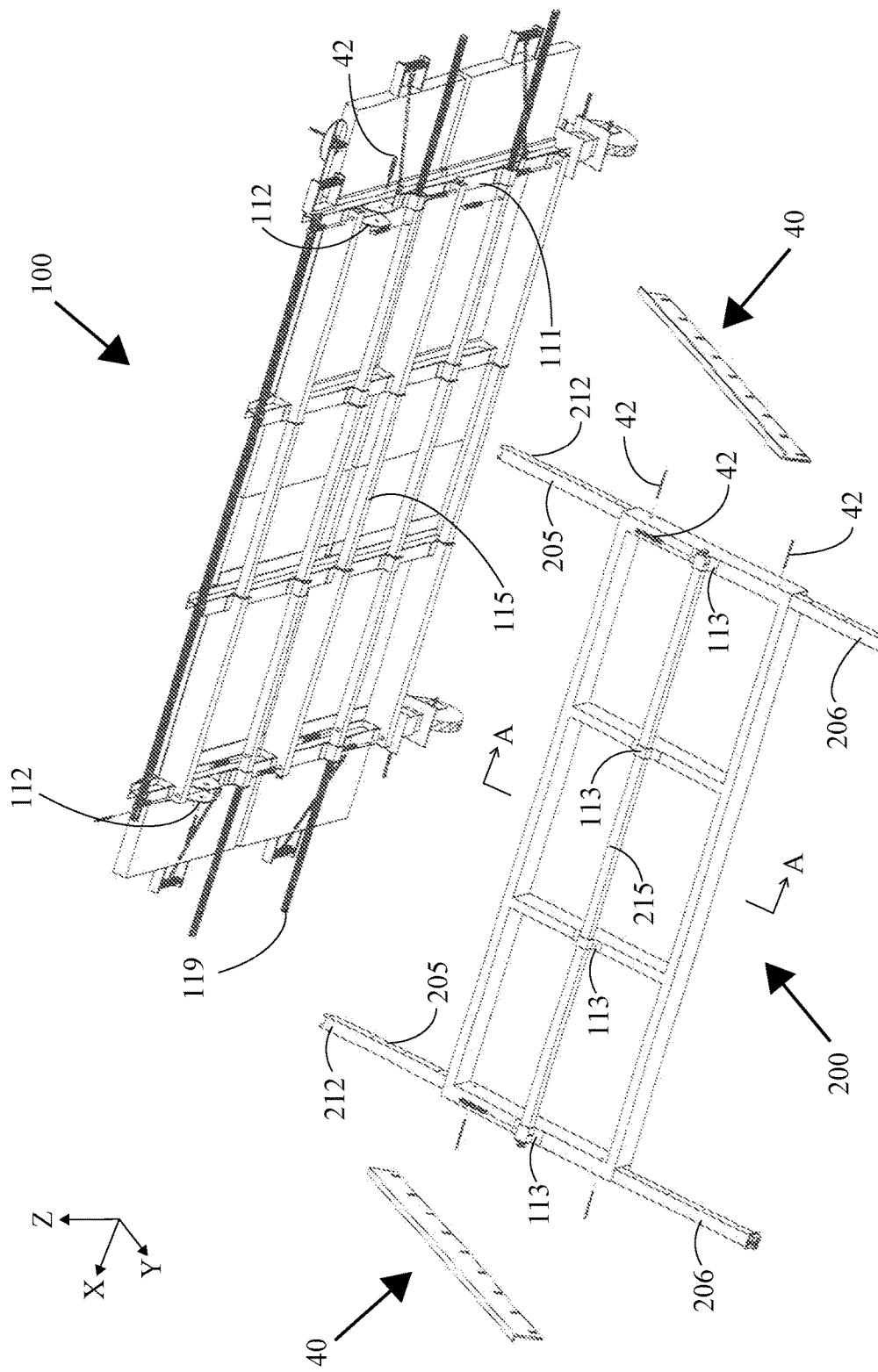
FIG. 3 is a perspective view of an example PPA separated into a solar panel platform, back support, and two link arms.

As shown in FIGS. 1 to 3, embodiment PPA 10 consists of two main components, the solar panel platform 100 and the back support 200, connected together with at least one (preferably two) link arms 40 and quick release pins 42; e.g., one at each side of solar panel platform 100 as shown in FIGS. 2 and 3. Solar panel platform 100 is used to support the solar panels. Back support 200 is used to support the solar panel platform 100, and to be used to adjust the tilt angle of the solar panels, based on adjustment of the link arm(s) 40. As shown in FIG. 3 (and FIG. 15), the link arm 40 may be made of an angle section, where its vertical flange has many notches, to be hooked onto the connector bar 115 (or other suitable location) of the solar panel platform 100 and the support bar 215 of the back support 200.

It is easy and fast to separate the back support 200 from the solar panel platform 100, as shown in FIG. 3, with enlarged details shown below in FIGS. 14 to 17. First, in FIG. 15, a user would remove the left-side and right-side link arms 40 from the ends of the connector bar 115 of the solar panel platform 100, and the ends of the support bar 215 of the back support 200. Next, in FIG. 14, they remove the quick release pins 42 from the left-side and right-side frame fittings 112 of the solar panel platform 100, and the left- and right-side support fittings 212 at the end of left-side and right-side upper legs 205 of the back support 200. Then, the back support 200 is separated from the solar panel platform 100.

Figure 4:
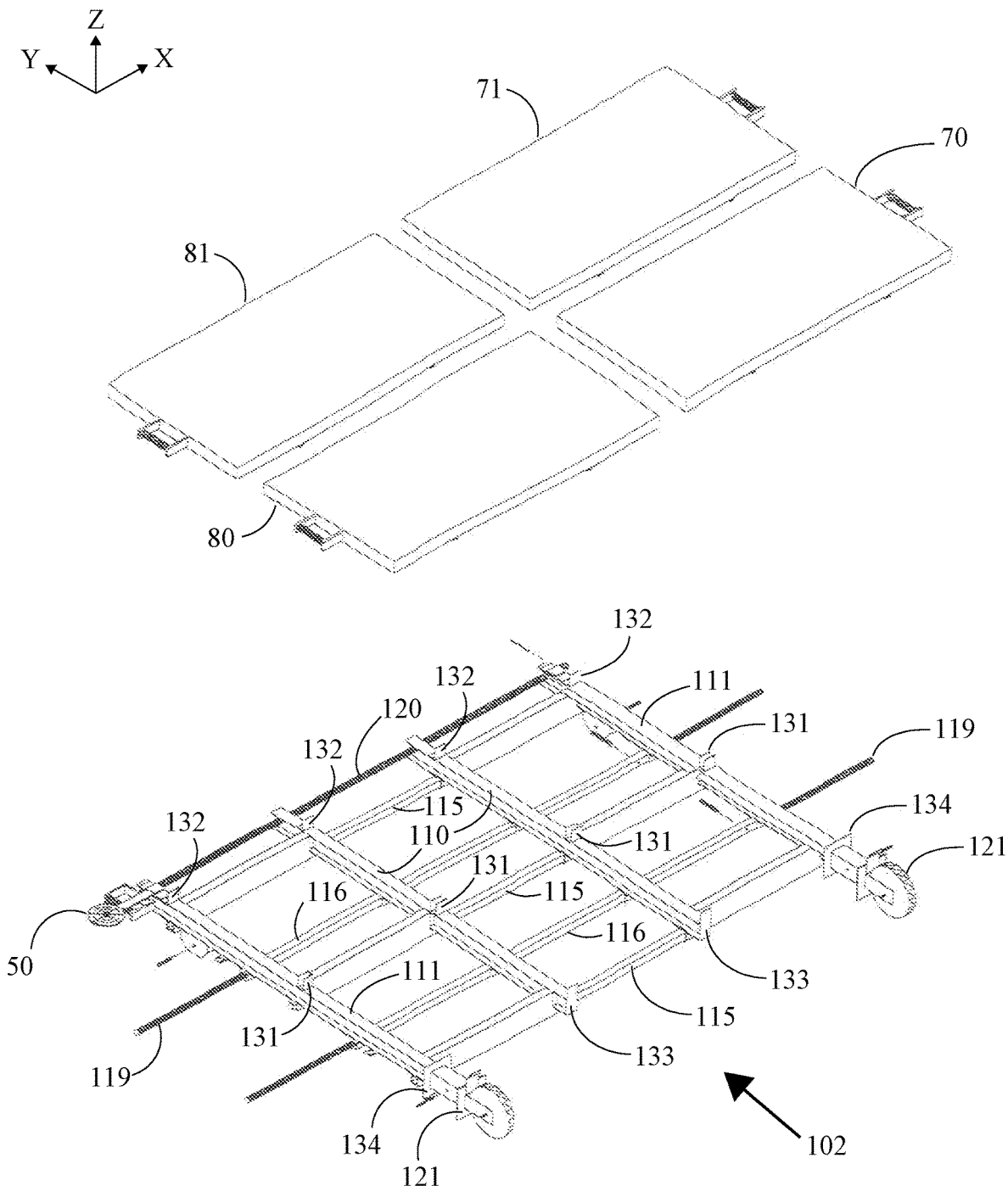
FIG. 4 is a front perspective view of an example platform structure after removing solar panels from the solar panel platform.

FIG. 4 shows the perspective front view of the example platform structure 102, the solar panels 70, 71, 80, and 81, the lift handles 119, the handle rod 120, and the sun tracker 50, of the solar panel platform 100. It is shown as laying down the solar panel platform 100 on the X-Y plane; then removing all the solar panels. When the solar panels are mounted on the platform structure 102, the upper panels are held by panel holder 131, a segment of channel section, at bottom; and by panel holder 132, a segment of angle section, on top. Both panel holder 131 and panel holder 132 are firmly attached to the flange of post 110 or post 111. While the lower panels are held by panel holder 131 on top; and, at bottom with panel holder 133 and panel holder 134 both are a piece of flat plate firmly attached to the bottom of post 110 or post 111. (Notably, FIGS. 26-29 below further describe details of one embodiment of a slide-locking configuration of the solar panels to the posts.)

FIG. 5 is an exploded view of separated elements of the platform structure 102. The elements in FIG. 5 may be small enough to be hand carried to rugged areas. There are illustratively the platform frames 105 and 106 for supporting solar panels, three connector bars 115 for connecting the platform frames 105 and 106, two lift bars 116 and four lift handles 119 for lifting the solar panel platform 100, one handle rod 120 for moving the PPA 10, one sun tracker 50, two wheel sets 121, and the leg tip 122. As the handle rod 120 is very close to the solar panels, it can be very hot in high temperature environment, and difficult for workers to hold on. Thus, it is desirable to mount the handle rod 120 on, only when moving the PPA 10; but, removed it when not used for moving. Therefore, it may have the handle at one end and quick release pin 42 at the other end to make the frequent mounting and removing easier. On each connector bar 115, lift bar 116, and lift handle 119, there may be rod stoppers 123 made of flat plate, firmly attached to them. When insert connector bar 115, lift bar 116, or lift handle 119 into a tube, or through a bar fitting 113 of platform frames 105 or 106, the rod stopper 123 may be used to stop it at the desirable position. The platform frames 105 and 106 will be held together at fixed distance with these elements. This will be discussed further in FIGS. 22 and 23. The leg tips 122 are prepared to be used to replace the wheel sets 121, if the PPA 10 will not be moved around for a long time.

FIG. 6 shows enlarged views of the wheel set 121, leg tip 122, and the end segment of connector bar 115 which is shown at the section cut A-A in FIG. 5. At the end of the end segment, it has the connect knob 117 for accepting the notches of the link arm 40, and the pin hole 118 for inserting the quick release pin 42 to attach the connector bar 115 onto the platform frames 105 and 106. Both the wheel set 121 and the leg tip 122 can be attached to the bottom of the post 111 with quick release pin 42. The wheel set 121 is used for moving the PPA 10 around a lot, or to far distances; otherwise, use the leg tip 122 to support the PPA 10. Both the leg tip 122 and wheel set 121 have a rod stopper 123 firmly attached to them. When inserting leg tip 122 or wheel set 121 into the bottom hole of the post 111, the rod stopper 123 will stop them at the correct location, with their pin holes 118 lined up with the pin holes at the bottom of post 111 for inserting the quick release pin 42. The wheel set 121 is preferably to be a swivel and brake caster.

FIGS. 7A-7B show two exploded perspective views, with an illustrative sun tracker 50 facing the opposite directions. In FIG. 7A. the sun tracker 50 separated into two elements, with the sun tracker plaque 51 facing upward, and the sun pointer 57 pulled out from bottom. There is a pattern of circles and straight lines drawn on the front of the sun tracker plaque 51. At the center of the circles, there is the pointer hole 54 for the sun pointer 57 to go through. When the sun tracker 50 is installed on PPA 10 and facing the sun, the sun light shadow of the sun pointer 57 falls on this patent of lines, which is used to navigate the PPA 10 to have sunray perpendicularly shinning on the solar panels.

FIG. 7B is rotating FIG. 7A 180 degrees about the X-axis, to show the back side of the sun tracker 50. The sun pointer 57 has the pointer stopper 58. The sun tracker plaque 51 has the plaque handle 52, and the pointer hook 53 firmly attached to it. There is the pointer hole 54 drilled through the plaque handle 52 and the sun tracker plaque 51. If packing the sun tracker 50 for a trip, it is better to remove the sun pointer 57 from the sun tracker plaque 51; then install it back later to be used. To show how to install the sun pointer 57 on the sun tracker plaque 51, in FIG. 7B, insert the sun pointer 57 into the pointer hole 54; stop when the pointer stopper 58 reaching the plaque handle 52. Twist the sun pointer 57 to move the short stick of the pointer stopper 58 into the gap between the plaque handle 52 and the pointer hook 53, to lock on to the sun tracker plaque 51. The installation is completed.

Note that other configurations of a sun tracker, particularly the shape and/or the pattern of circles and straight lines drawn on the front of the sun tracker plaque 51, may be used to adequately show the user the general perpendicular aiming of the PPA 10 (and the solar panels) toward the sun's rays, and the embodiment shown herein is merely one example of a sun tracker configuration that is not meant to be limiting to the scope of the embodiments herein.

Figures 8, 9:
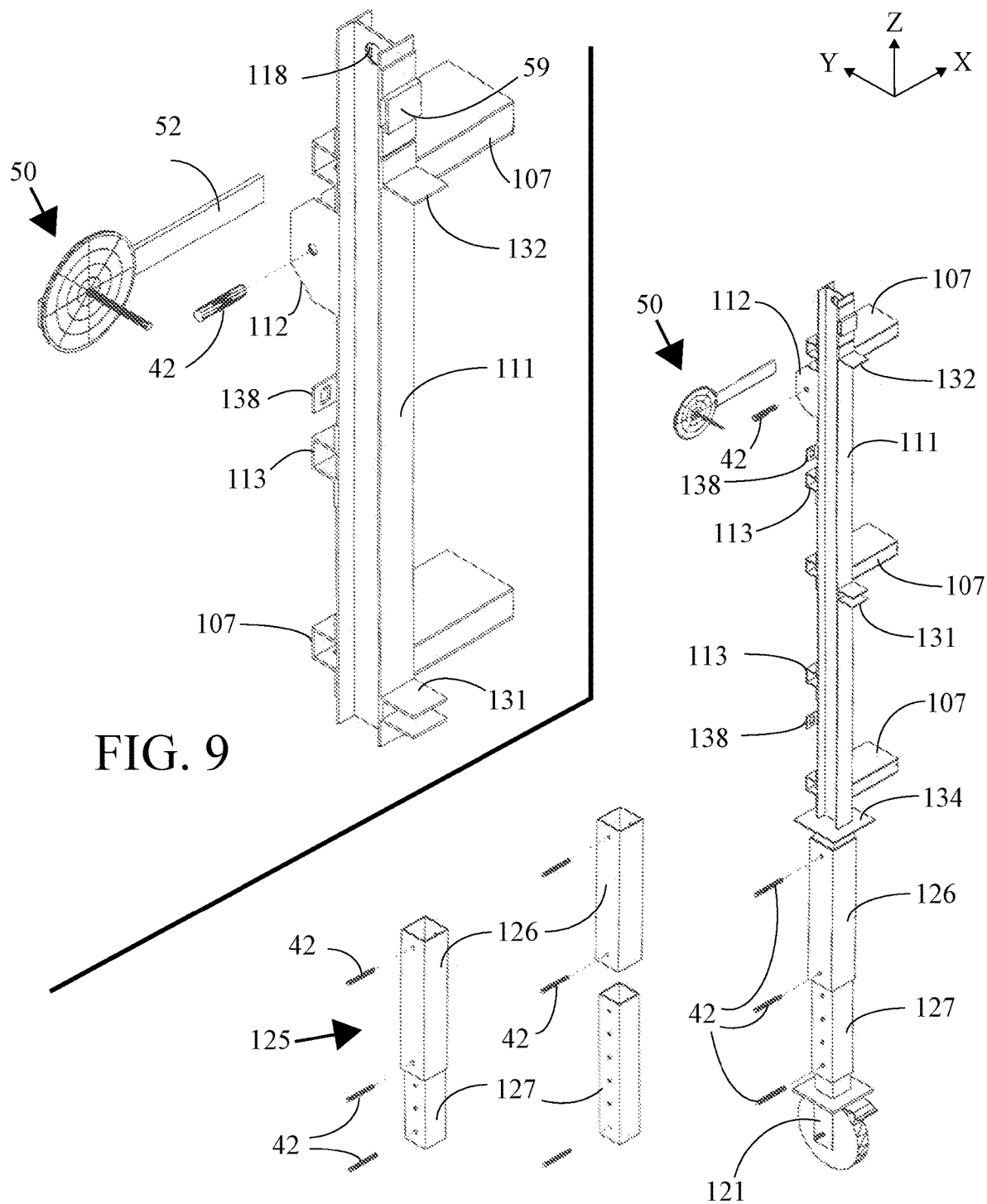
FIG. 8 shows an enlarged exploded perspective view of an example post, which is a segment of the platform frame of FIG. 5, and an attachable extension, which can be separated into an upper extension and lower extension.
FIG. 9 shows an enlarged exploded perspective view of an example of an upper segment of the post of FIG. 8.

FIG. 8 shows the detail of attachable extension 125, and how to attach it onto post 111, which is part of the platform frame 105 in FIG. 5. The attachable extension 125 consists of two segments, the upper extension 126 and the lower extension 127, connected with quick release pins 42 through the pair of holes at bottom of upper extension 126, and a selected pair of the holes on lower extension 127 for desired length. To install the attachable extension 125 at the bottom of the post 111, remove the wheel set 121 from the post 111, then attach the top of attachable extension 125 to the bottom of post 111 with quick release pin 42. Afterward, attach the wheel set 121 back to the bottom of the attachable extension 125 with quick release pin 42. Attaching two different length attachable extension 125 at the bottom of left and right post 111 can put the PPA 10 to desire level and tilt position at uneven and sloping area.

FIG. 9 is an enlarged view of upper segment of the post 111 in FIG. 8; to show a better view of some small elements attached on it. Both the tracker holder 59 and the bar fitting 113 may be made of a channel section member with flange at each side, and both flanges firmly attached on the flange of the post 111. The panel anchor 138 may be a piece of flat plate with a hole for panel tie 137 to attach. The panel anchor 138 also firmly attaches on the flange of the post 111. The panel anchor 138 will be discussed later in FIG. 25. To install the sun tracker 50 on solar panel platform 100, insert its plaque handle 52 into the hole of the tracker holder 59

Figure 10:
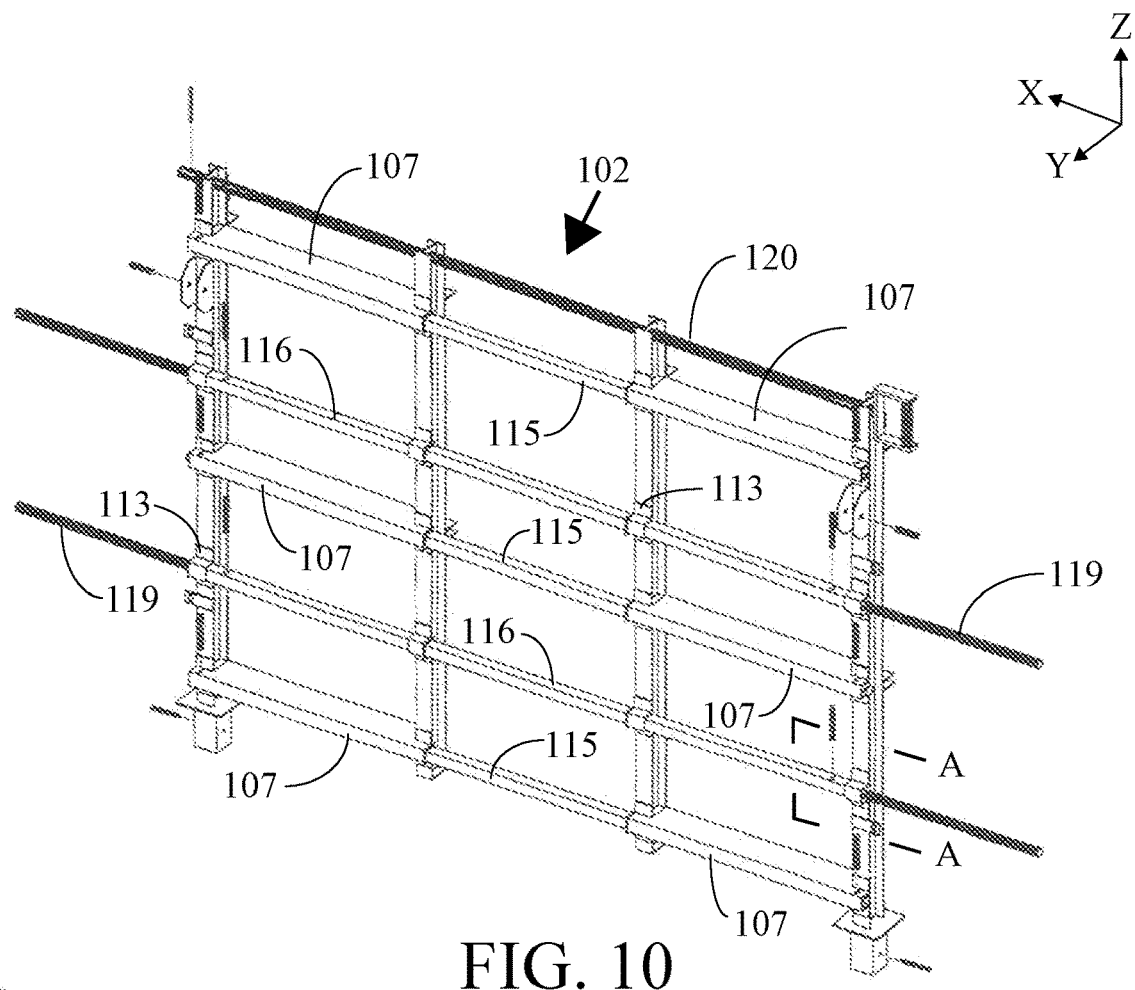
FIG. 10 is a perspective rear view of the platform structure shown in FIG. 4, with wheel sets removed.

FIG. 10 shows the perspective backside view of the platform structure 102 of FIG. 4 standing vertically, without the wheel sets 121.

Figure 11:
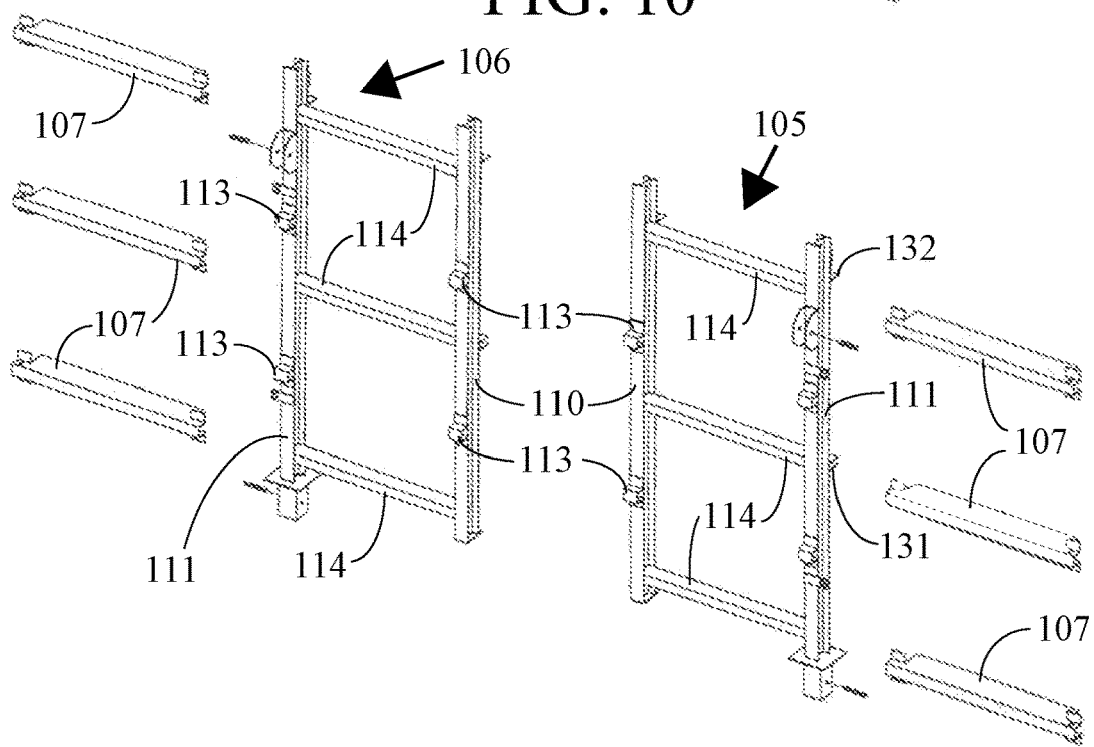
FIG. 11 shows an exploded perspective rear view of an example platform structure into separated elements, after connector bars, lift bars, lift handles, and handle rod have been removed.

FIG. 11 is an exploded view of the platform structure 102 of FIG. 10, after eliminating the handle rod 120, connector bars 115, lift bars 116, and lift handles 119. Such that, FIG. 11 shows only the perspective backside view of the remaining elements of platform frames 105 and 106 standing vertically, and six reinforce channels 107. Platform frames 105 and 106 are rigid frames made of vertical post 110, post 111, and horizontal frame beams 114, firmly attached together. Both the post 110 and the post 111 may be made of I-section member, and the frame beam 114 may be made of rectangular tube. Both ends of the frame beam 114 are placed between the flanges of the I-section member post 110 and post 111, and attached together firmly. The reinforce channel 107 may be made of channel section member. Each reinforce channel 107 is firmly attached onto a frame beam 114; and creates a rectangular tunnel for inserting connector bar 115 to connect the two platform frames 105 and 106 to form the platform structure 102, as shown in FIG. 10. There are illustratively six bar fittings 113, two each firmly attached on post 110 or post 111. The bar fitting 113 may be a segment of channel with a flange at each side. More enlarged details are shown later in FIGS. 15 and 16.

Figure 12:
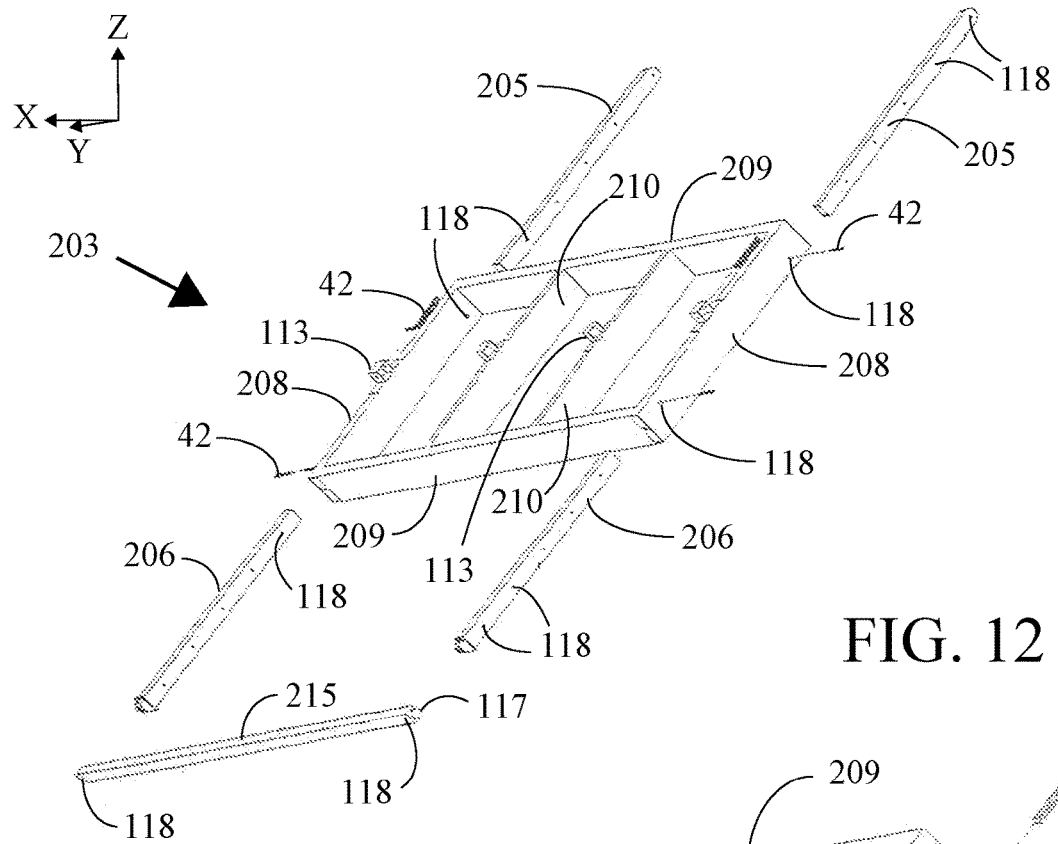
FIG. 12 shows an exploded perspective view of the back support of FIG. 3.

FIG. 12 is an exploded view of separated elements of the back support 200, which is shown in FIG. 3. The following explains how to construct the back support 200 with all these separated elements. Back support frame 203 consists of two horizontal beams 209 and two interior beams 210, all four are illustratively rectangular tubes; and two side beams 208 each are made by attaching firmly two rectangular tubes together. These six members are attached firmly to build the back support frame 203. There are illustratively four bar fittings 113, each one firmly attached on a side beam 208 or an interior beam 210. The upper leg 205 and the lower leg 206 are illustratively made of rectangular tubes, with many pin holes 118 drilled through their sides. In addition, there is illustratively the support bar 215 made of rectangular tube. The upper leg 205 will be inserted into the hole of lower rectangular tube of the side beam 208; while the lower leg 206 will be inserted into the hole of the upper rectangular tube of the side beam 208. After moving the upper leg 205 and lower leg 206 to the appropriate location, insert quick release pins 42 through the pin holes 118 on the side beam 208 and upper leg 205 or lower leg 206 to secure their position. Finally, install the support bar 215 on the back support frame 203 by inserting it through all four bar fittings 113, which will be shown in FIG. 13 later. Then, the back support 200 is completely constructed.

Figure 13:
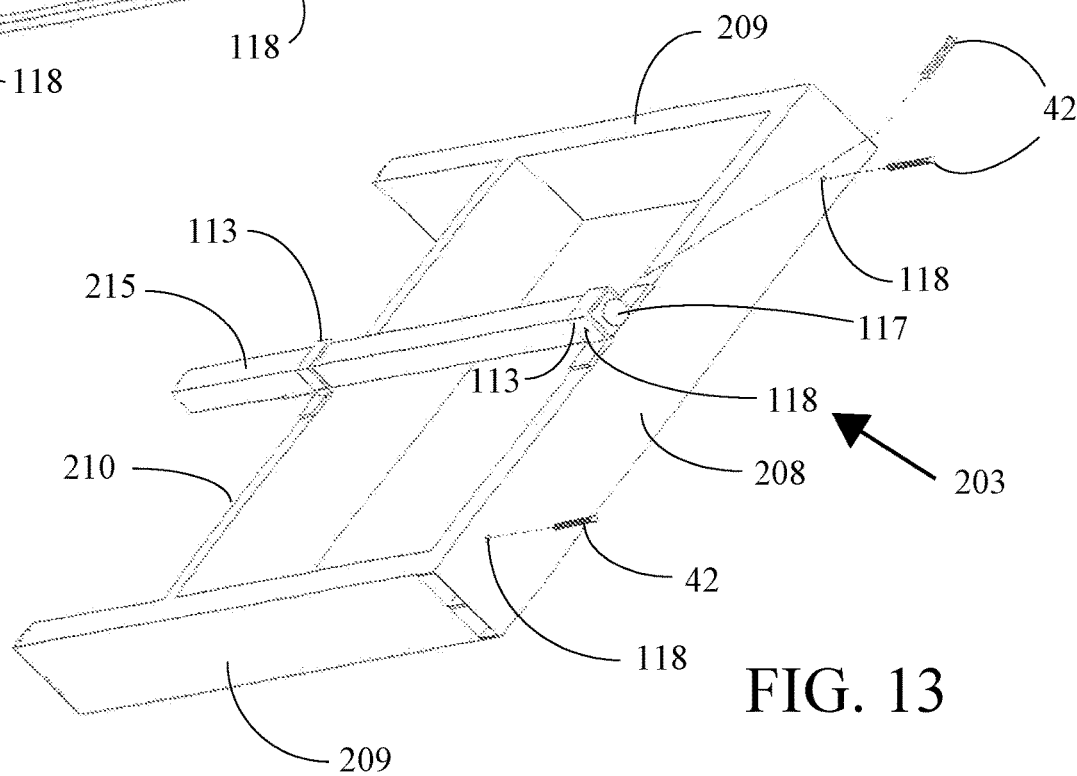
FIG. 13 shows an enlarged sectional perspective view of the segment cut off from back support of FIG. 3, at section A-A.

FIG. 13 is an enlarged view of the right-side half of back support frame 203 and the support bar 215 of FIG. 12. The support bar 215 is illustratively made of rectangular tube, with the connect knob 117 at each end. At both ends of support bar 215, and the bar fitting 113 which is on the side beam 208, there are pin holes 118 for inserting quick release pin 42. After the support bar 215 is inserted into all four bar fittings 113 on the back support frame 203, insert the quick release pin 42 through the pin holes 118 on the bar fitting 113 and the support bar 215 to secure the position. The left-side half of the back support frame 203 and the support bar 215 will be installed the same way.

FIGS. 14 to 17 are used to show how to connect the solar panel platform 100 and the back support 200 of FIG. 3 to construct the complete embodiment of PPA 10 as shown in FIG. 2. FIG. 14 shows a segment of the post 111 with the frame fitting 112 firmly attached on it, both from solar panel platform 100; and the upper leg 205 from the back support 200. FIG. 15 shows: (1) A group of segments from the solar panel platform 100, including segments of the post 111, the reinforce channel 107, and the frame beam 114, attaching firmly together and a segment of the connector bar 115 inserted inside of the reinforce channel 107. This group is enlarged and shown in FIG. 16, with the connector bar 115 removed out of the reinforce channel 107. (2) A group of elements from the back support 200, including a bar fitting 113 firmly attached to a segment of the side beam 208, and a segment of support bar 215 inserted into the bar fitting 113. (3) a link arm 40. FIG. 17 shows an enlarged view of the segment of the support bar 215 which is removed out from the bar fitting 113. They are shown in FIG. 15.

To connect the solar panel platform 100 and the back support 200 to construct the PPA 10 can be done by performing the following process at both left and right side of PPA 10. Starting from FIG. 14, insert the support fitting 212 of the upper leg 205, which is installed in the back support 200 as explained above with FIG. 12, into the frame fitting 112. Secure that position by inserting the quick release pin 42 through the pin holes on both elements. Next, move the back support 200 to achieve the desired angle with the solar panel platform 100. This will be discussed further in FIGS. 19 to 21. Last, in FIG. 15, latch the link arm 40 with appropriate notches onto the connect knobs 117 of the connector bar 115 and the support bar 215. Then, the constructing of PPA 10 is completed.

FIG. 18 shows the lift handle 119, the bar fitting 113, segments of the lift bar 116 and the post 111. The lift handle 119 is used to make moving the PPA 10 easier. To install the lift handle 119, first insert the lift bar 116 through all four bar fittings 113 on the two platform frames 105 and 106, as discussed in FIGS. 10 and 11. FIG. 18 shows how the right end of the lift bar 116 installed in the bar fitting 113. Then, insert the lift handle 119 into the end hole of the lift bar 116; until the rod stopper 123 of the lift handle 119 stopped by the lift bar 116 or the post 111. Insert the quick release pin 42 into the pin holes 118 of the lift bar 116 and the lift handle 119. Perform the same process to install the left lift handle 119 to the left end of the lift bar 116. The rod stopper 123 of both left and right lift handle 119 will prevent the lift bar 116 and the lift handles 119 being pulled out.

FIGS. 19 to 21 are used to show how to attain the desirable tilt angle of solar panels on PPA 10 to produce more electricity output. FIG. 19 shows the right-side view of PPA 10 as shown in FIG. 2. During early morning and late afternoon, the sun is at low altitude. It is more productive to adjust the tilt angle of solar panels of PPA 10 as shown in FIG. 20. If the back support 200 being moved to a position too close to solar panel platform 100, the anchors 46 must be attached to PPA 10 to prevent it toppled by wind or earthquake force, as discussed at FIGS. 1 and 2. When the sun is at higher altitude, it is more productive to tilt the solar panels of PPA 10 to position as shown in FIG. 21. Rocks, dirt, etc. can be placed under the wheel set 121 to tilt the solar panel platform 100 further to horizontal position if needed.

To change the tilt position of PPA 10 from FIG. 19 to that of FIG. 20 or 21, the process starts by removing the link arm 40 from both left and right sides of PPA 10. Then perform one of the following two processes to both sides of PPA 10.

In case of reducing the tilt as shown in FIG. 20, rotate the back support 200 closer to solar panel platform 100. Then, hook the link arm 40 back to the connect knob 117 of the solar panel platform 100 and the connect knob 117 of the back support 200; as discussed in FIG. 15.

In case of increasing the tilt of solar panels as shown in FIG. 21, perform the following process at both left and right side of PPA 10. In FIGS. 12 and 13, remove one or both of the quick release pins 42 from the pin holes 118 on the side beam 208 of the back support frame 203. Adjust the inserted distance of the upper leg 205 and/or the lower leg 206 inside the back support frame 203 to desired position. Put back the quick release pins 42 to keep them there. Then hook the link arm 40 back to the connect knob 117 of solar panel platform 100 and the back support 200; as discussed in FIG. 15.

Figure 22:
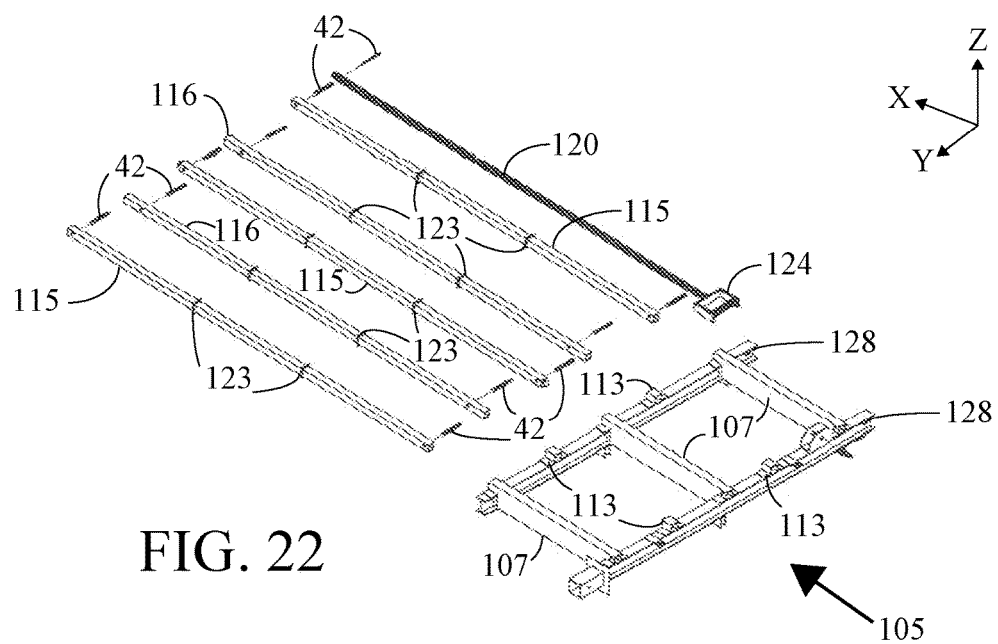
FIG. 22 shows the perspective view of example components to be assembled for building the platform structure of FIG. 4.
Figure 23:
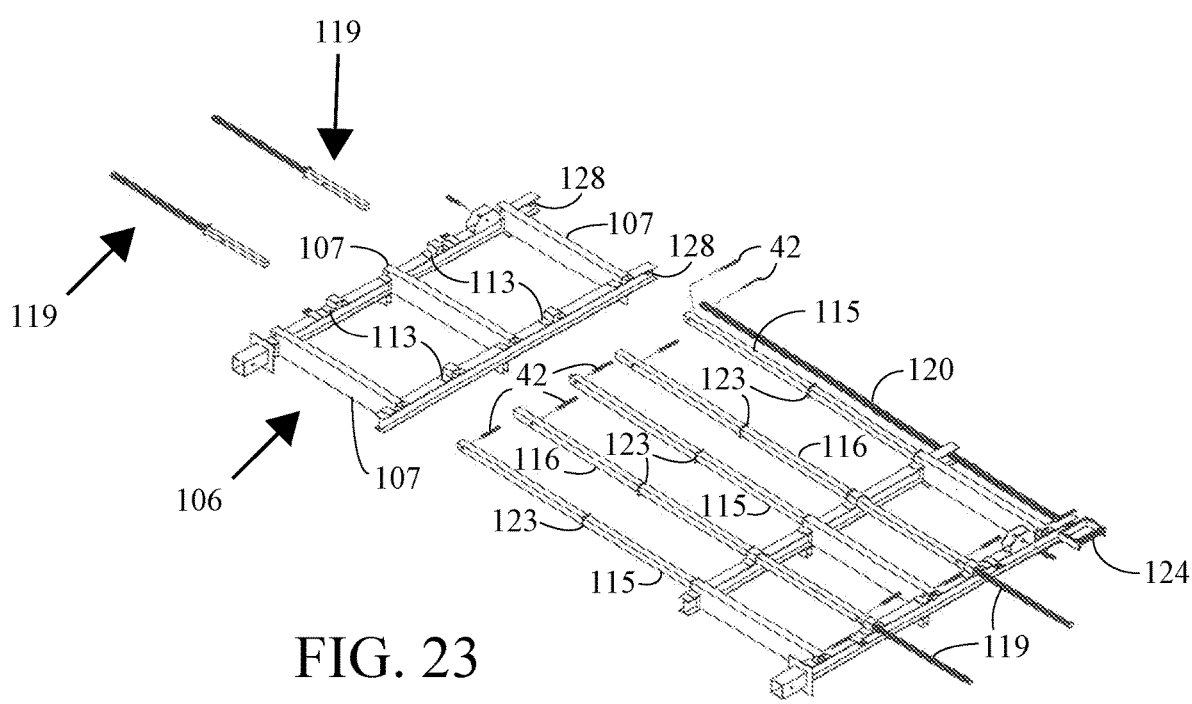
FIG. 23 shows the perspective view of more example components to be added to the result of FIG. 22, for building the platform structure of FIG. 4.

FIGS. 22 and 23 illustrate, in two operations, how to construct the platform structure 102 which is shown in FIG. 4, with small elements. In FIG. 22, there are three connector bars 115, two lift bars 116, one handle rod 120, and a right-side platform frame 105. On each connector bar 115 and lift bar 116. there are two rod stoppers 123 which is also shown and discussed in FIGS. 5, 6, and 18.

In FIG. 22, the first operation is installing the connector bars 115, the lift bars 116, and the handle rod 120 into the platform frame 105 with following three steps: (1) Insert each connector bar 115 into the reinforce channel 107 on the platform frame 105. Stop insertion when their rod stopper 123 touching the platform frame 105. Then, insert the quick release pins 42 through the pin holes on the reinforce channel 107 and the connector bar 115 to connect them together, forming the right-side half of the platform structure 102. (2) Insert each lift bar 116 into the two aligned bar fittings 113 on the platform frame 105. Stop insertion when their rod stoppers 123 touching the platform frame 105. Then, insert the quick release pins 42 through the pin holes on bar fitting 113 and the lift bar 116 to connect them together. (3) Insert the handle rod 120 through the two rod holes 128 on top of the platform frame 105. Stop insertion when the handle rod holder 124 touching the platform frame 105.

In FIG. 23, it shows the second operation of installing of the left-side platform frame 106 onto the right-side half of platform structure 102, which was formed in the first operation as explained above with FIG. 22; and then the four lift handles 119. The second operation has the following steps: (1) Align the elements on the left-side platform frame 106 with the bars and rod of the right-side half of the platform structure 102; such that, the connector bars 115 with the reinforce channels 107, each lift bar 116 with a pair of aligned bar fittings 113, and the handle rod 120 with the pair of rod holes 128 on top of the platform frame 106. (2) Move the left-side platform frame 106 toward the right-side half of the platform structure 102. Let the bars and rod inserted into the aligned elements on the left-side platform frame 106. Stop insertion when the rod stoppers 123 on the bars touching the left-side platform frame 106. Then, insert the quick release pin 42 through the pin holes on each pair of reinforce channel 107 and connector bar 115 to connect them together; and through the pin hole at the end of handle rod 120 to prevent pulling out of the handle rod 120. (3) Insert the four lift handles 119 into the ends of the two lift bars 116; one each into either the left or right end of the lift bar 116. Detail of this installation is explained in FIG. 18. This completes the construction of the platform structure 102 as shown in FIG. 10.

The next operation is installing the right solar panel 80 onto the right-side platform frame 105 of platform structure 102; which will be shown in FIGS. 24 to 29. The same method can be used to install the upper solar panel 81; also, the left solar panels 70 and 71 onto the left-side platform frame 106. Refer to FIG. 4, the lower right solar panel 80 is installed between the bottom of the two panel holders 131, and the top of the panel holders 133 and 134. Upper right solar panel 81 is installed between the bottom of the two panel holders 132 and top of the two panel holders 131.

Figure 24:
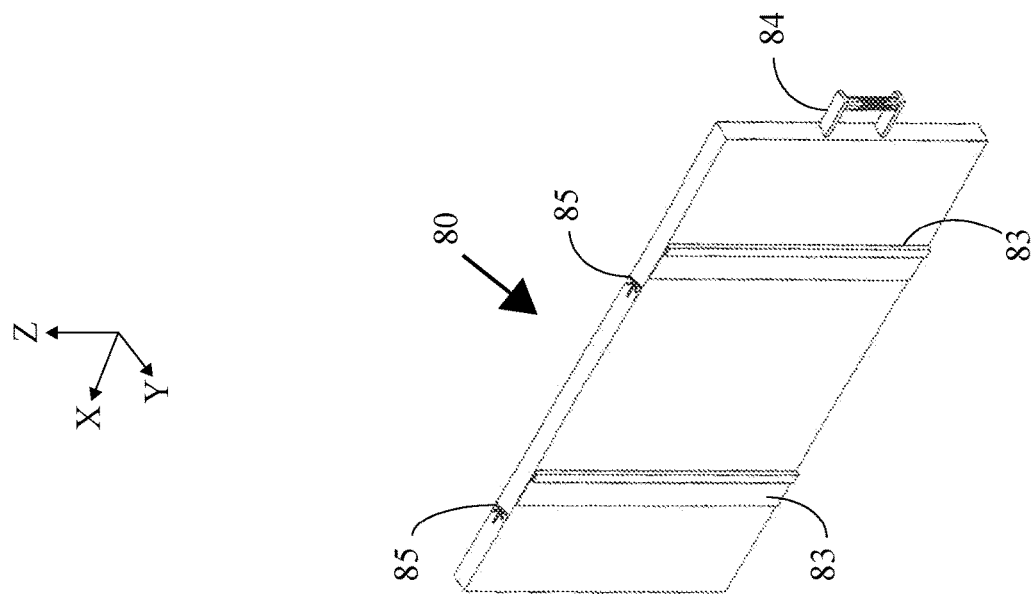
FIG. 24 shows a perspective rear elevation view of the right solar panel as shown in FIG. 4.

FIG. 24 shows the perspective rear view of the right solar panel 80. Two panel stiffeners 83, which are made of channel section, and a panel handle 84 are firmly attached to the right solar panel 80. Because both panel stiffeners 83 are at the back side of the right solar panel 80, the person to install the right solar panel 80 is unable to see the panel stiffener 83, and difficult to move the right solar panel 80 to the best location for mounting. Hence, two guide marks 85 may be etched or painted on the top edge of the right solar panel 80.

They are used to indicate the better location to install the right solar panel 80, as explain later in FIGS. 26 to 29. The right solar panel 81 is exactly the same as the right solar panel 80. As shown in FIG. 4, the left solar panels 70 and 71 are mirror image of the right solar panels 80 and 81 on a mirror on Y-Z plane.

Figure 25:
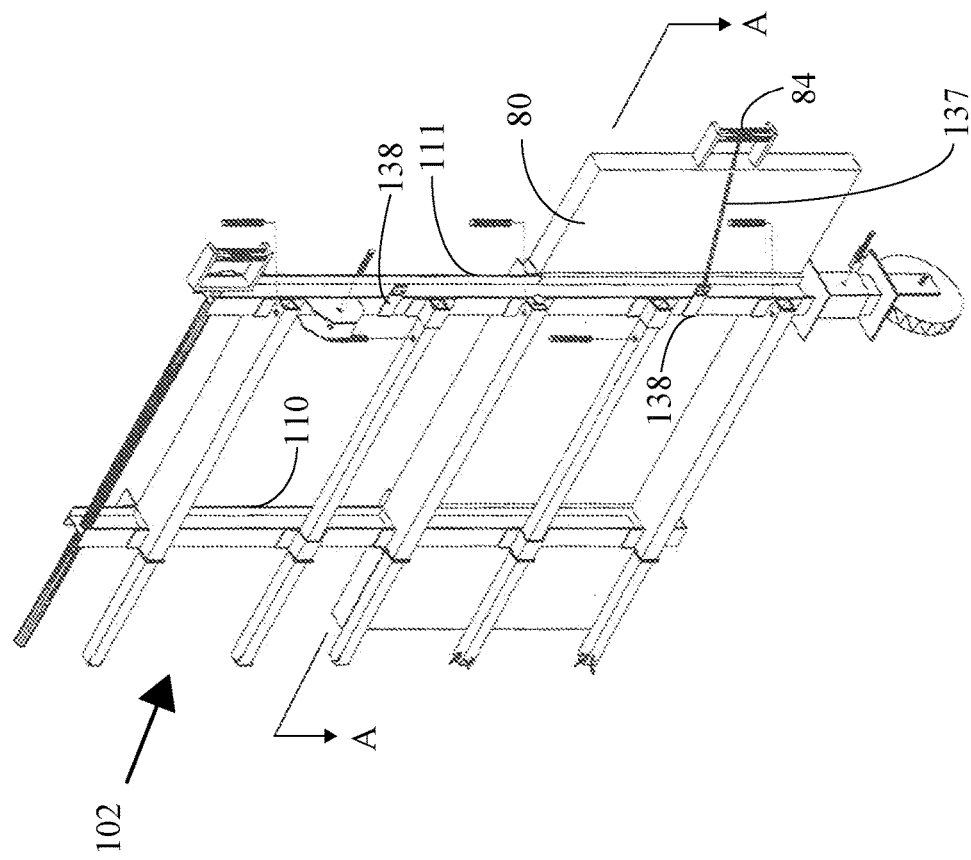
FIG. 25 shows a fragmentary perspective rear elevation view of the right-side half of platform structure as shown in FIG. 10, attached with the solar panel in FIG. 24.

FIG. 25 shows the partial perspective rear view of the right-side half of platform structure 102, with the lower right solar panel 80 mounted on the post 111 and the post 110; and tied with the panel tie 137 on the panel handle 84, and on the panel anchor 138 on the post 111. The panel tie 137 is used to prevent the solar panel being pulled out from the PPA 10 in the x-axis direction due to earthquake shock force, or the PPA 10 falling down to the side. In ordinary situations, the panel tie 137 is not needed.

Figure 26:
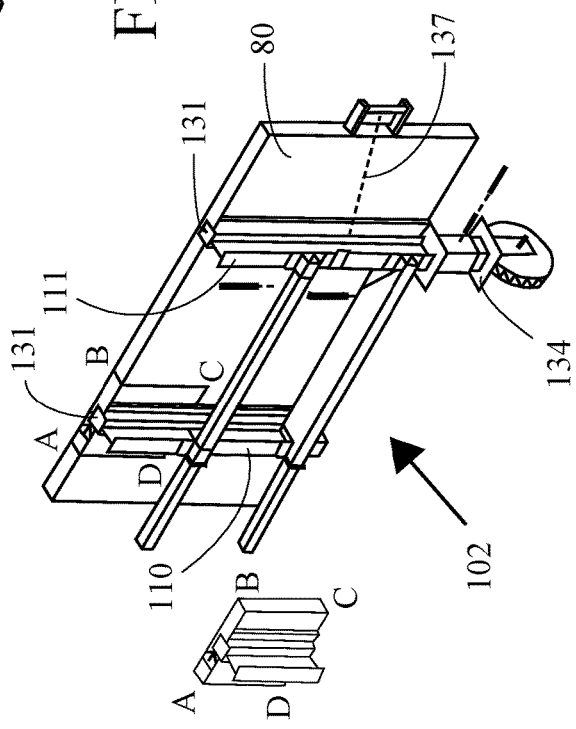
FIG. 26 shows a fragmentary perspective view of the bottom half of the embodiment shown in FIG. 25, below the section cut A-A, along with an example fragmentary piece shown from the embodiment as shown along lines A-B-C-D.

FIG. 26 shows the lower half of the embodiment of the platform structure 102 in FIG. 25, cut off at Section A-A. Also, a segment A-B-C-D is cut as shown. Then, the segment A-B-C-D is enlarged and shown in FIGS. 27 to 29, which are used to show the three steps to hook the right solar panel 80 onto the post 110 as shown in FIG. 26; also, the right solar panel 80 will be hooked onto the post 111 at the same time.

Figure 27:
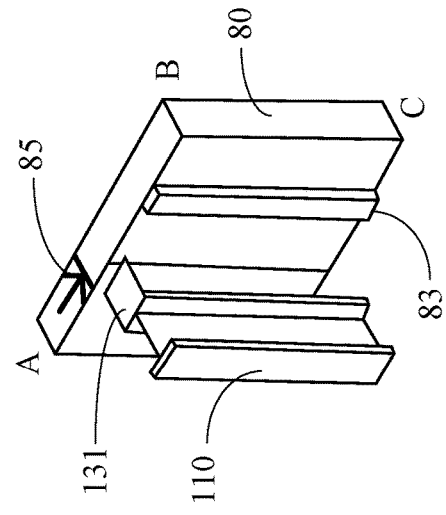
FIGS. 27, 28, and 29 illustrate the piece A-B-C-D of FIG. 26 showing an example process to attach the solar panel on the platform structure of FIG. 25.
Figures 28, 29:
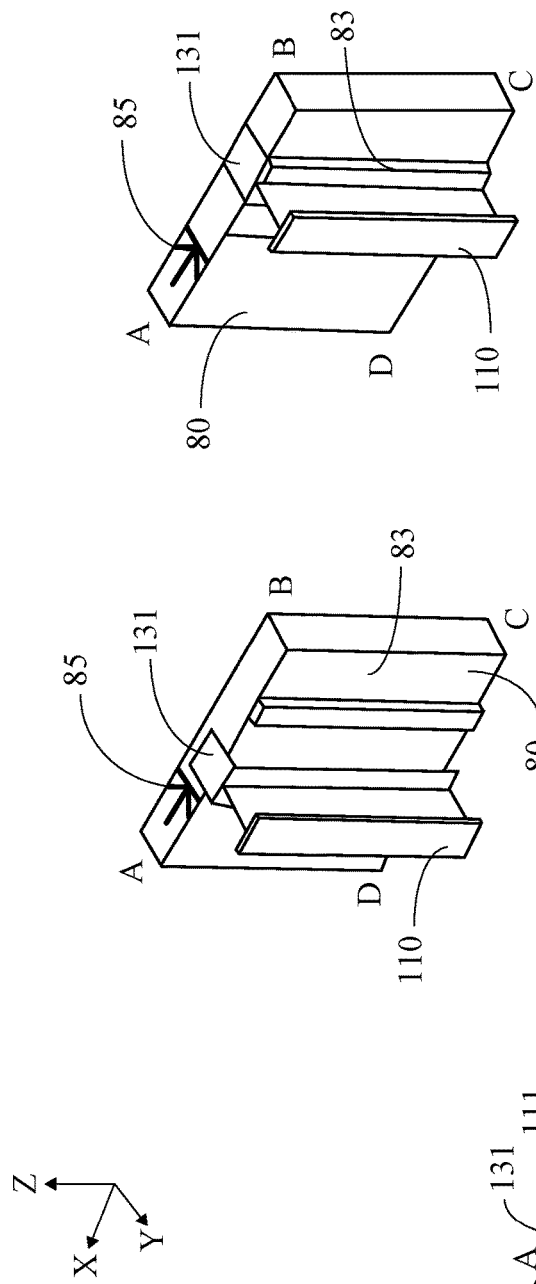

The first step is shown in FIG. 27. The solar panel 80 is moved close to the post 110, with the arrow head and thick line of the guide mark 85 located slightly to the left of panel holder 131. The second step is shown in FIG. 28. The solar panel 80 is pushed toward the post 110, under the bottom of panel holder 131; until touching the post 110; also, the right side of the panel touching the post 111. Now, the solar panel 80 is held between the panel holder 131 on top, and the panel holders 133 and 134 at bottom. The third and final step is shown in FIG. 29. The solar panel 80 is pushed to hook the left-side panel stiffener 83 onto the flange of post 110, and the right-side panel stiffener 83 onto the flange of post 111; until one or both panel stiffeners 83 stop by the flanges.

The left solar panels 70 and 71 can be installed on the left-side platform frame 106 with the same three steps as shown in FIGS. 27 to 29. Then, the construction of PPA 10 is completed.

The present disclosure thus provides a portable photovoltaic assembly that is many times more powerful (more electricity) than conventional small-scale portable solar power products available today (e.g., supporting solar panels that provide near one kilowatt of power, versus only a few hundred watts of power), but without being difficult to manage or transport like other large-scale solar power systems. That is, the embodiments herein can be made of smaller parts that can be hand-carried to rugged terrains (or air-dropped, or carried in bulk on vehicles, etc.), to reach places that have traditionally been difficult to reach.

Although the present disclosure has been described in connection with LDCs, uses during or after natural disasters and war, or for low-cost applications, the disclosure is not intended to be limited to these specific applications or uses. On the contrary, it is intended to cover such alternatives, modifications, and equivalents as can be reasonably appreciated by those skilled in the art.

While there have been shown and described illustrative embodiments of an portable photovoltaic assembly (PPA 10), it is to be understood that various other adaptations and modifications may be made within the intent and scope of the embodiments herein. For example, different numbers, types, and shapes of supports, bars, pins, connectors, solar panels, etc. may be used to achieve similarly functional embodiments. That is, numerous other changes, substitutions, variations, alterations, and modifications may be ascertained to one skilled in the art and it is intended that the present disclosure encompass all such changes, substitutions, variations, alterations, and modifications as falling within the scope of equivalent embodiments. In addition, as mentioned above, other components needed for operation of a solar panel assembly that are conventional are not shown for brevity (e.g., inverter, battery, cables, etc.), and those skilled in the art will understand the configuration needed to connect to the solar panels herein. Other components, such as communication links, GPS locators, and so on, may also be added to the PPA 10 herein for further utility of the assembly in various use-cases.

In other words, the foregoing description has been directed to specific embodiments, and it will be apparent that other variations and modifications may be made to the described embodiments, with the attainment of some or all of their advantages. Accordingly this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A portable support system capable of holding solar panels, comprising:
    a solar panel platform having:
        a plurality of platform frames,
        a plurality of reinforce channels attached to a rear of each of the plurality of platform frames,
        a plurality of connector bars that are each insertable into at least one respective reinforce channel of the plurality of reinforce channels on the rear of each of the plurality of platform frames, the plurality of connector bars, when inserted into the at least one respective reinforce channel of the plurality of reinforce channels on the rear of each of the plurality of platform frames, configured to hold the plurality of platform frames together at a fixed distance, and
        a plurality of solar panel holders affixed to a front of each of the plurality of platform frames and configured to hold one or more solar panels,
        wherein the solar panel platform, when assembled with the plurality of connector bars inserted into the at least one respective reinforce channel of the plurality of reinforce channels on the rear of each of the plurality of platform frames, is configured to support a plurality of solar panels;
    a back support frame that, when pivotably connected at a top of the back support frame to a rear of the solar panel platform, extends away from the solar panel platform at a range of angles between the solar panel platform and the back support frame;
    one or more link arms each comprising a plurality of notches located at a plurality of positions, wherein the one or more link arms, when connected to the solar panel platform at a first particular notch of the plurality of notches and to the back support frame at a second particular notch of the plurality of notches, hold a particular angle within the range of angles between the solar panel platform and the back support frame;
    a plurality of removable and adjustable legs that extend from the solar panel platform; and
    a plurality of removable and adjustable legs that extend from the back support frame, wherein the plurality of removable and adjustable legs that extend from the solar panel platform and the plurality of removable and adjustable legs that extend from the back support frame are independently adjustable to account for uneven terrain on which the portable support system is assembled.

2. The portables support system as in claim 1, wherein the one or more link arms are configured to connect to the plurality of connector bars the solar panel platform and to a plurality of respective support bars of the back support frame that correspond to the plurality of connector bars.

3. The portable support system as in claim 1, wherein one or more of the plurality of connector bars comprise lift bars with handles extending outwardly from the plurality of platform frames.

4. The portable support system as in claim 1, wherein the back support frame comprises:
   a plurality of removable and adjustable legs extending from the top of the back support frame, wherein the back support frame is pivotably connected to the rear of the solar panel platform via the plurality of removable and adjustable legs extending from the top of the back support frame.

5. The portable support system as in claim 1, further comprising:
   a plurality of quick release pins.

6. The portable support system as in claim 1, further comprising:
   a sun tracker configured to facilitate pointing of the portable support system toward a sun.

7. The portable support system as in claim 6, wherein the sun tracker comprises:
   a sun tracker plaque; and
   a sun pointer arranged to cast a shadow onto the sun tracker plaque.

8. The portable support system as in claim 6, wherein the sun tracker comprises:
   a sun tracker plaque with a pattern of circles; and
   a sun pointer extending from a center of the pattern of circles.

9. The portable support system as in claim 1, further comprising:
   at least two wheels located on either the plurality of removable and adjustable legs that extend from the solar panel platform or the plurality of removable and adjustable legs that extend from the back support frame.

10. The portable support system as in claim 9, wherein the at least two wheels are removeable and comprise swivel and brake casters.

11. The portable support system as in claim 1, further comprising:
   a removable carrying handle attached to the solar panel platform.

12. The portable support system as in claim 1, further comprising:
   one or more anchor ties attached to the portable support system, the one or more anchor ties configured to tie the portable support system to one or more stable objects.

13. The portable support system as in claim 12, wherein the one or more stable objects are selected from a group consisting of: trees; rocks; stakes; bags of sand; bags of rocks; buildings; and machinery.

14. The portable support system as in claim 1, further comprising:
   one or more solar panels attached to the solar panel platform.

15. The portable support system as in claim 14 further comprising:
   one or more panel stiffener channels on a back of the one or more solar panels, wherein the one or more panel stiffener channels are configured to lockingly slide into engagement with the solar panel platform.

16. The portable support system as in claim 1, wherein the solar panel platform further has a plurality of bar fittings attached to the rear of each of the plurality of platform frames.

17. A portable photovoltaic assembly capable of holding solar panels, comprising:
   a solar panel platform having:
      a plurality of platform frames,
      a plurality of reinforce channels attached to a rear of each of the plurality of platform frames, the plurality of reinforce channels,
      a plurality of connector bars that are each insertable into at least one respective reinforce channel of the plurality of reinforce channels on the rear of each of the plurality of platform frames, the plurality of connector bars, when inserted into the at least one respective reinforce channel of the plurality of reinforce channels on the rear of each of the plurality of platform frames, configured to hold the plurality of platform frames together at a fixed distance, wherein one or more of the plurality of connector bars comprise lift bars with handles extending outwardly from the plurality of platform frames,
      a plurality of solar panel holders affixed to a front of each of the plurality of platform frames and configured to hold one or more solar panels, and
      a removable carrying handle attached to the solar panel platform,
      wherein the solar panel platform, when assembled with the plurality of connector bars inserted into the at least one respective reinforce channel of the plurality of reinforce channels on the rear of each of the plurality of platform frames, is configured to support a plurality of solar panels;
   a back support frame that, when pivotably connected at a top of the back support frame to a rear of the solar panel platform, extends away from the solar panel platform at a range of angles between the solar panel platform and the back support frame, wherein the back support frame has a plurality of respective support bars of the back support frame that correspond to the plurality of connector bars, the back support frame having:
      a plurality of removable and adjustable legs extending from the top of the back support frame, wherein the back support frame is pivotably connected to the rear of the solar panel platform via the plurality of removable and adjustable legs extending from the top of the back support frame;
   one or more link arms configured to connect to the plurality of connector bars the solar panel platform and to the plurality of respective support bars of the back support, wherein each of the one or more link arms comprise a plurality of notches located at a plurality of positions, wherein the one or more link arms, when connected to the solar panel platform at a first particular notch of the plurality of notches and to the back support frame at a second particular notch of the plurality of notches, hold a particular angle within the range of angles between the solar panel platform and the back support frame;
   a plurality of removable and adjustable legs that extend from the solar panel platform;

a plurality of removable and adjustable legs that extend from the back support frame, wherein the plurality of removable and adjustable legs that extend from the solar panel platform and the plurality of removable and adjustable legs that extend from the back support frame are independently adjustable to account for uneven terrain on which the portable photovoltaic assembly is assembled;

a plurality of quick release pins;

a sun tracker configured to facilitate pointing of the portable photovoltaic assembly toward a sun, the sun tracker having:
  a sun tracker plaque with a pattern of circles, and
  a sun pointer extending from a center of the pattern of circles;

at least two wheels located on either the plurality of removable and adjustable legs that extend from the solar panel platform or the plurality of removable and adjustable legs that extend from the back support frame, wherein the at least two wheels are removeable and comprise swivel and brake casters;

one or more anchor ties attached to the portable photovoltaic assembly, the one or more anchor ties configured to tie the portable photovoltaic assembly to one or more stable objects selected from a group consisting of: trees; rocks; stakes; bags of sand; bags of rocks; buildings; and machinery;

one or more solar panels attached to the solar panel platform; and one or more panel stiffener channels on a back of the one or more solar panels, wherein the one or more panel stiffener channels are configured to lockingly slide into engagement with the solar panel platform.

18. The portable photovoltaic assembly capable of holding solar panels as in claim 17, wherein the solar panel platform further has a plurality of bar fittings attached to the rear of each of the plurality of platform frames.

* * * * *